United States Patent [19]

Yahata

[11] Patent Number: 5,760,999
[45] Date of Patent: Jun. 2, 1998

[54] HARD DISC SPACER AND HARD DISC CLAMP

[75] Inventor: Heikichi Yahata, Okaya, Japan

[73] Assignee: Kabushiki Kaisha Soode Nagano, Nagano, Japan

[21] Appl. No.: 867,681

[22] Filed: Jun. 2, 1997

Related U.S. Application Data

[62] Division of Ser. No. 720,600, Sep. 30, 1996, abandoned.

[30] Foreign Application Priority Data

Apr. 30, 1996 [JP] Japan .................. 8-108966

[51] Int. Cl.⁶ ................. G11B 17/02; G11B 33/14
[52] U.S. Cl. ..................... 360/98.01; 360/98.08
[58] Field of Search ............. 360/98.08, 99.12, 360/98.01

[56] References Cited

U.S. PATENT DOCUMENTS

| | | | |
|---|---|---|---|
| 4,999,724 | 3/1991 | McAllister | 360/98.01 X |
| 5,272,581 | 12/1993 | Kojima et al. | 360/98.01 |
| 5,436,775 | 7/1995 | Ishimatsu | 360/98.08 |
| 5,550,687 | 8/1996 | Suzuki | 360/98.08 |

FOREIGN PATENT DOCUMENTS 61-148667  7/1986  Japan .................. 360/98.08

*Primary Examiner*—John H. Wolff
*Attorney, Agent, or Firm*—Jordan and Hamburg

[57] ABSTRACT

An object of the present invention is to provide a hard disc which prevents alien bodies and rust from falling onto hard discs and securely holds the hard discs in parallel alignment. In a first basic structure of the hard disc spacer, the hard disc spacer is made of a metal and coated with a hard metal coating layer. In a second basic structure thereof, the hard disc spacer is made of a metal and coated with a ceramic coating layer. In a third basic structure thereof, the hard disc spacer is made of glass. In a first basic structure of the hard disc clamp, the hard disc clamp is made of a metal and coated with a hard metal coating layer. And in a second basic structure thereof, the hard disc clamp is made of a metal and coated with a ceramic coating layer.

14 Claims, 2 Drawing Sheets

HARD DISC SPACER AND HARD DISC CLAMP

This is a division of application Ser. No. 08/720,600, filed Sep. 30, 1996.

BACKGROUND OF THE INVENTION

The present invention relates to a hard disc spacer and a hard disc clamp, more precisely relates to a hard disc spacer for keeping a clearance between hard discs in a hard disc drive unit and a hard disc clamp for fixing hard discs therein.

An inner structure of a conventional hard disc drive unit will be explained with reference to FIG. 1.

In FIG. 1, an electric motor 10 is fixed to a chassis 12, which is formed like a box, of the hard disc drive unit.

A rotary shaft 14, which is formed like a column, is connected with an output shaft 16 of the motor 10. There is formed a flange section 18 at a lower end (an end on the chassis 12 side) of the rotary shaft 14. There is formed a female screw hole 20 in an upper face of the rotary shaft 14.

Hard discs 22 are made of a glass material and formed like thin circular plates. Each hard disc 22 has an attaching hole 24, whose diameter is slightly greater than outer diameter of the rotary shaft 14, in the center. The rotary shaft 14 is inserted through the attaching holes 24 of the hard discs 22, and the hard discs 22 are fixed on the rotary shaft 14. Note that, a magnetizable material (not shown) is applied on surfaces of the hard discs 22, and data are recorded on the magnetizable layers of the hard discs 22.

Spacers 26 are formed as rings as shown in FIGS. 2 and 3. The spacers 26 fit over the rotary shaft 14, and each spacer 26 is provided between the adjacent hard discs 22. Inner diameter of the spacer 26 is slightly greater than the outer diameter of the rotary shaft; outer diameter of the spacer 26 is almost equal to that of the flange section 18 of the rotary shaft 14.

A clamp 28 is attached to the rotary shaft 14 so as to fix the hard discs 22 and the spacers 26 on the rotary shaft 14. As shown in FIGS. 7 and 8, the clamp 28 is also formed as a thin circular plate. There is formed a through-hole 30 in the center of the clamp 28, and there is formed a circular groove 32 in an outer fringe section of the clamp 28.

As shown in FIG. 1, the clamp 28 is fixed on the upper end face of the rotary shaft 14, on which the hard discs 22 and the spacers 26 have been alternately attached, by a screw 34. A part of a bottom face of the clamp 28, which corresponds to the circular groove 32, biases the spacer 26 downward, so that the hard discs 22 and the spacers 26 are pinched between the clamp 28 and the flange section 18 of the rotary shaft 14. With this structure, the hard discs 22 and the spacers 26 can be fixed on the rotary shaft 14.

When the screw 34 is tightly screwed, the center part of the clamp 28 is elastically indented, so the elastic force biases the upper spacer 26, which contacts the clamp 28, downward.

Conventionally, the spacers 26 and the clamp 28 are made of metal materials and made by cutting and machining the metal materials. Their surfaces are finished by lapping and barrel polishing. Then they are cleansed to remove relatively large abrasive particles, e.g., alumina particles, and machining oil, which adhere during the barrel polishing. Note that, in the case that the hard disc spacers 26 and the hard disc clamp 28 are made of stainless steel, oxide layers are formed on the surfaces thereof, after the cleansing step, so as to prevent forming rust thereon.

However, the conventional hard disc spacers 26 and the conventional hard disc clamp 28 have following disadvantages.

The hard discs 22 are rotated, at high speed, together with the rotary shaft 14 by the motor 10 so as to read a great quantity of data. Since clearance between a magnetic head and the surface of the hard disc 22 is very narrow, the degree of flatness of the hard discs 22 and the degree of parallel alignment therebetween must be high. Concretely, the required degree of flatness is about 5 μ; the required degree of parallel alignment is about 1.5 μ.

Namely, the clearance between the magnetic head and the the surface of the hard disc 22 is quite narrow, so the high accuracy is required. Thus, if any minute alien bodies are stuck on the surface of the hard disc 22, there is possibility of damaging the magnetic layer coating the surface of the hard disc 22 and/or the magnetic head of the hard disc drive unit by colliding the magnetic head with the alien bodies.

Therefore, as described above, the spacers 26 and the clamp 28 are cleansed after the lapping step and the barrel polishing step to remove the alien bodies, e.g., abrasive particles, and abraded powders. But the alien bodies cannot be completely removed by the cleansing, e.g., super sonic cleansing.

Initially the alien particles, which cannot be removed by the cleansing, are tightly stuck on the surfaces of the hard disc spacers 26 and the hard disc clamp 28. But, since the hard disc spacers 26 and the hard disc clamp 28 are rotated, at high speed, together with the hard discs 22 and the rotary shaft 14, the alien particles are gradually peeled off from the hard disc spacers 26 and the hard disc clamp 28 and finally fall onto the hard discs 22, so that the hard discs 22 and/or the hard disc drive unit are damaged by collision.

Further, the conventional hard disc spacers and the conventional hard disc clamps are made of metals, e.g., stainless steel, and aluminium. Thus, dents are formed in the hard disc spacers and the hard disc clamps by mutual collision while they are manufactured and/or conveyed. If the dents are formed in the metalic spacers and the metalic clamps, projections are simultaneously formed around edges of the dents. Especially, if the dents are formed in the surfaces of the spacers, which contact the hard discs, the spacers cannot keep the hard discs in parallel. The spacers and the hard discs are tightly clamped by the hard disc clamp, so the hard discs may be deformed by the clamping force. By the disc deformation, the magnetic heads are apt to make reading errors, etc., so that reliability of the hard disc drive unit will be lower.

Since the hard disc spacers and the hard disc clamps are made of metal, rust is formed and falls onto the hard discs. The rust on the hard discs also damages the hard discs and/or the hard disc drive unit as do as the alien bodies.

SUMMARY OF THE INVENTION

An object of the present invention is to provide a hard disc spacer and a hard disc clamp, which are capable of preventing alien bodies and rust from falling onto hard discs and securely holding the hard discs parallel.

To achieve the object, the present invention has following structures.

In a hard disc spacer, which fit on a rotary shaft of a hard disc drive unit, for keeping a clearance between hard discs, a first basic structure is characterized in:

that the hard disc spacer is made of a metal and formed into a ring; and that a surface of the hard disc spacer is coated with a coating layer, which is made of a hard metal.

In the first basic structure, the surface of the hard disc spacer is optionally further coated with an outer coating layer, which is formed by ceramic spraying and which is formed on the outer side of the inner coating layer made of the hard metal. Both side faces of the hard disc spacer are polished and made mutually parallel.

A second basic structure of the hard disc spacer is characterized in:

that the hard disc spacer is made of a metal and formed into a ring; and that a surface of the hard disc spacer is coated with a coating layer, which is made of a ceramic.

In the second structure, both side faces of the hard disc spacer are optionally polished and made mutually parallel.

A third basic structure of the hard disc spacer is characterized in:

that the hard disc spacer is made of glass and formed into a ring.

In the third structure, both side faces of the hard disc spacer are optionally rough surfaces. The surface of the hard disc spacer is optionally coated with an electric conductive layer.

In a hard disc clamp, which is screwed to an end face of a rotary shaft of a hard disc drive unit, for fixing a plurality of hard discs to the rotary shaft, a first basic structure is characterized in:

that the hard disc clamp is made of a metal and formed into a circular disc; and that a surface of the hard disc clamp is coated with a coating layer, which is made of a hard metal.

A second basic structure of the hard disc clamp is characterized in:

that the hard disc clamp is made of a metal and formed into a circular disc; and that a surface of the hard disc clamp is coated with a coating layer, which is formed by ceramic spraying.

In the hard disc spacer and the hard disc clamp of the present invention, if they are made of the metal materials and coated with the coating layers, alien bodies are prevented from falling onto the hard discs; if they are made of the glass, adhered alien bodies stuck are easily removed. Damage to the hard discs and/or the hard disc drive unit is thus prevented. Reading errors of the hard disc drive unit also are prevented.

By forming the coating layers, surface hardness of the spacer and the clamp is increased, so formation of dents in the spacer and the clamp is prevented, even if they are mutually collided while they are manufactured and/or conveyed. Thus, the degree of flatness of the hard disc clamp is kept higher. And the deformation of the hard discs is prevented, even if the hard disc clamp tightly clamps the hard discs together with the hard disc spacers.

In the case that the hard disc spacer and the hard disc clamp are coated with the coating layers or made of glass, their surface hardness is improved, so no projections are apt to be formed on their surfaces; the hard discs are thus held parallel in the hard disc drive unit. By holding the hard discs parallel, reading errors of the hard disc drive unit are reduced, and the reliability thereof is improved.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Figure 1:
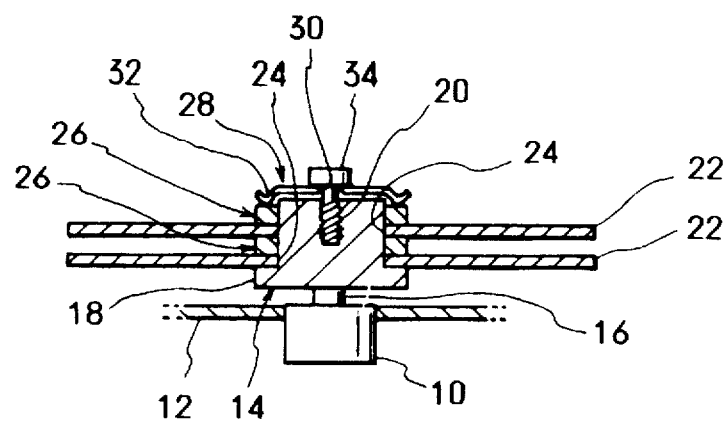
FIG. 1 is a partial sectional view of a main part of a hard disc drive unit.

Preferred embodiments of the present invention will now be described in detail with reference to the accompanying drawings. Note that, the structure of the hard disc drive unit of following embodiments is the same as that described in BACKGROUND OF THE INVENTION with reference to FIG. 1, so explanation will be omitted in the following embodiments.

A method of manufacturing a hard disc spacer 26 of a First Embodiment is described below with reference to FIGS. 2–6.

Figure 2:
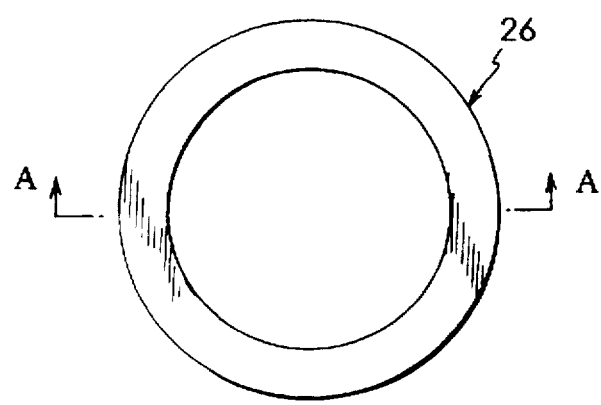
FIG. 2 is a plan view of a spacer shown in FIG. 1.
Figure 3:
FIG. 3 is a sectional view taken along a line A—A in FIG. 2.

Firstly, a starting piece 26a of the hard disc spacer 26 is formed into a ring shape, as shown in FIG. 2, by press machining, cutting, casting, etc. The starting piece 26a is made of stainless steel, e.g., SUS-430 of JIS (Japanese Industrial Standard), aluminum, etc. An inner diameter of the starting piece 26a is slightly greater than outer diameter of the rotary shaft 14 to fit over the rotary shaft 14. The outer diameter of the starting piece 26a is almost equal to the outer diameter of the flange section 18.

To remove flash, which is formed when the starting piece 26a is formed into the ring shape, in a surface of the starting piece 26a, the starting piece 26a is polished by a barrel polishing machine.

To make the surface of the starting piece 26a smooth and to correct size error thereof, the starting piece 26a is finished by a lapping machine after the barrel polishing step.

After the lapping step, the finished starting piece 26a is cleansed so as to remove alien bodies, e.g., alumina particles, abraded powders, from the surface of the starting piece 26a. Then the surface of the starting piece 26a is coated with a coating layer 36. The coating layer 36 is made of a hard metal or a ceramic. The hard metal layer 36 is formed by a coating manner, e.g., hard chrome finishing, chrome finishing, nickel-plating, titanium coating; the ceramic layer 36 is formed by ceramic spraying. In the case of forming the hard metal layer, the thickness of the coating layer 36 is about 10 µ; in the case of forming the ceramic layer, the thickness of the coating layer 36 is about 50 µ. The thickness of the coating layer 36 is designed according to thichness of the alien bodies and a margin to secondary lapping, which is executed to correct size error again. Namely, the thickness of the finished coating layer 36, which has been executed the secondary lapping, is thicker than the thickness of the alien bodies.

Figure 4:
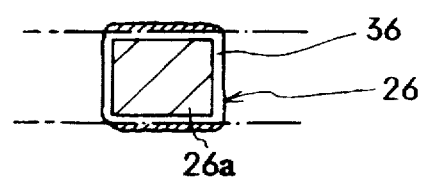
FIG. 4 is a partial sectional view of a hard disc spacer of a first embodiment of the present invention.

After forming the coating layer 36, as shown in FIG. 4, the upper face and the lower face (the both side faces) of the starting piece 26a are executed the secondary lapping to remove slashed line parts of the coating layer 36 so as to correct the size error again. By the secondary lapping, the upper and the lower faces of the starting piece 26a are made flat and mutually parallel. Finally, the starting piece 26a is cleansed, and the hard disc spacer 26 is completed.

Figure 5:
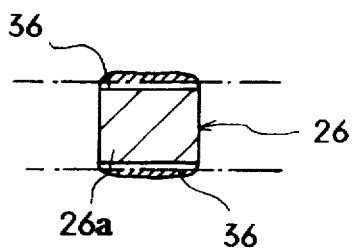
FIG. 5 is a partial sectional view of a hard disc spacer of another example.
Figure 6:
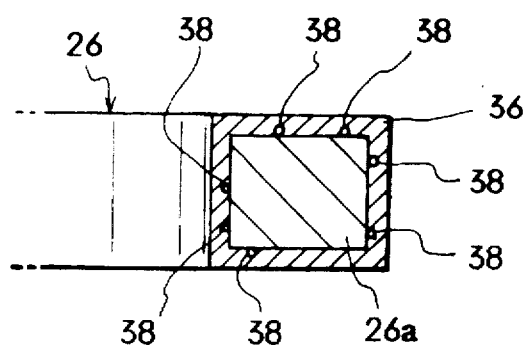
FIG. 6 is an enlarged view of the hard disc spacer, which has one coating layer, shown in FIG. 4.

The coating layer 36 may be formed on the whole surface of the hard disc spacer 26 (see FIG. 4); the coating layers 36 may be formed on the upper and the lower faces, which contact the hard discs 22, of the hard disc spacer 26 (FIG. 5). The coating layers 36 shown in FIG. 5 can be formed by the ceramic spraying. The slashed line parts in FIG. 5 are also removed by the secondary lapping step, as well as the example shown in FIG. 4, so as to make the both side faces of the hard disc spacer 26 flat.

In the present embodiment, the coating layer 36 is formed on the surface of the hard disc spacer 26. By forming the coating layer 36, the coating layer 36 covers over the alien bodies 38 (see FIG. 6), which were stuck on the surface of the starting piece 26a when the starting piece 26a was machined or finished by machines. With this structure, the alien bodies 38 in the coating layer 36 cannot fall onto the hard discs 22, so that the trouble caused by the alien bodies 38 is effectively prevented. By forming the hard coating layer 36, hardness of the surface of the hard disc spacer 26 is greater. For example, the hardness of the hard disc spacer 26 made of stainless steel, e.g., SUS-430, without the coating layer 36, is about HV (Vickers hardness) 180; the hardness of the hard disc spacer 26 made of stainless steel, e.g., SUS-430, with the coating layer 36, can be improved to HV 500. By improving the hardness, the surfaces of the hard disc spacers 26 are not damaged even if the hard disc spacers 26 are mutually collided while manufacturing or conveying. Thus, the side faces, which contact the hard discs 22, of the hard disc spacer 26 are kept flat, so the deformation of the hard discs 22 is prevented when the hard disc spacer 26 is tightly clamped together with the hard discs 22. Further, no rust is formed on the hard disc spacer 26, so the trouble in the hard disc drive unit, which is caused by the rust fallen onto the hard discs 22, is prevented.

Figure 7:
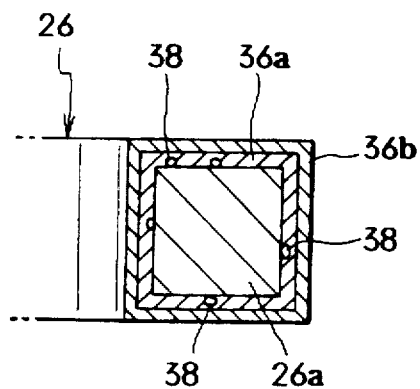
FIG. 7 is an enlarged view of the hard disc spacer of a second embodiment, which has two coating layers.

A Second Embodiment will be described with reference to FIG. 7.

In the Second Embodiment, two coating layers are formed on the surface of the hard disc spacer 26 as an inner coating layer 36a and the outer coating layer 36b. Firstly, the hard metal coating layer is formed as the inner coating layer 36a, then the outer coating layer 36b is formed by the ceramic spraying.

In the Second Embodiment, total thickness of the two coating layers 36a and 36b is equal to the thickness of the coating layer 36 of the First Embodiment. Specific gravity of the ceramic is smaller than that of the hard metal, so weight of the hard disc spacer 26 of the Second Embodiment is lighter than that of the First Embodiment. With the hard disc spacers 26 of the Second Embodiment, acceleration and braking the rotation of the hard discs 22 can be executed a shorter time, so that the hard disc drive unit can access data a shorter time.

In a Third Embodiment, the hard disc spacer 26, whose shape is the same as the hard disc spacer 26 shown in FIG. 2, is made of glass.

In the present embodiment, the hard disc spacer 26 and the hard discs 22 are made of the same material: glass, whose rate of thermal expansion is about $9 \sim 10 \times 10^{-6}/°C$. On the other hand, in the First Embodiment and the Second Embodiment, the hard disc spacer 26 is made of the stainless steel, whose rate of thermal expansion is about $17.3 \times 10^{-6}/°C$. Therefore, in the present embodiment, difference of the thermal expansion between the hard disc 22 and the hard disc spacer 26 is quite small. So force deforming the hard discs 22, which is generated by the difference of the thermal expansion between the hard discs 22 and the hard disc spacers 26 in the hard disc drive unit, is quite small. Due to the small deforming force, the degree of flatness of the hard discs 22 and the degree of parallel alignment therebetween is improved.

To manufacture the glass hard disc spacer 26, first melted glass is introduced into a die, whose inner space is formed into a ring shape. After the glass is solidified, the hard disc spacer 26 having a ring shape (see FIG. 2) is completed. Successively, the both side faces, which contact the hard discs 22, of the hard disc spacer 26 are polished to them flat and mutually parallel. Finally, the polished hard disc spacer 26 is cleansed in a water cleansing tub so as to remove abraded powders formed while the polishing step.

As described above, machining oil, which is used to machine the metalic hard disc spacer, is not used in the steps of manufacturing the glass hard disc spacer 26, so the glass hard disc spacer 26 can be cleansed, with water, in a short time, and manufacturing efficiency is improved.

In the glass hard disc spacer 26 of the present invention, no rust is formed on the surface of the hard disc spacer 26, so no rust falls onto the hard discs 22. Since no rust falls onto the hard discs 22, the trouble due to damaging the hard discs 22 and/or the hard disc drive unit is prevented.

Since the hard disc spacer 26 is made of the glass, specific gravity of the hard disc spacer 26 is quite smaller than that of the metalic hard disc spacer, so that the acceleration and the braking the rotation of the hard discs 22 can be executed in shorter time; the hard disc drive unit can access data in shorter time. With light weight, influence of unbalanced load can be reduced.

Hardness of the glass is generally greater than that of metal materials, so the surface of the glass hard disc spacer 26 is less susceptible to being damaged. In the metalic hard disc spacers, as described in BACKGROUND OF THE INVENTION, a projection is formed in at a fringe of a dent, which is formed in the surface of the metalic hard disc spacer when the metalic hard disc spacer is damaged. But even if the glass hard disc spacer 26 is partially broken, no projection is formed on the surface of the glass hard disc spacer 26, so that the flat faces of the glass hard disc spacer 26 are maintained, and the deformation of the hard discs 22 is prevented when the hard discs 22 are tightly clamped together with the glass hard disc spacers 26.

Further, the glass is less expensive than the metal materials, so manufacturing cost of the hard disc spacer 26 is reduced.

Note that, examples of the glass materials for the present embodiment are as follows:

(1) ordinary glass or soda glass mainly including: sodium oxide; calcium oxide; and silicon dioxide;
(2) lead glass mainly including: plumbic oxide; kalium oxide; and silicon dioxide;
(3) hard second-class glass mainly including: sodium oxide; boron oxide; aluminum oxide; and silicon dioxide; and
(4) hard first-class glass mainly including: sodium oxide; boron oxide; aluminum oxide; and silicon dioxide.

An electric conductive layer is formed to coat the whole surface of the glass hard disc spacer 26 so as to discharge static electricity, which is charged in the hard discs 22 by friction between air and the hard discs 22 rotating at high speed, to the chassis 12 via the rotary shaft 14. The electric conductive layer is made of an electric conductive material, e.g., aluminium, magnesium, copper, and it is formed on the surface of the glass hard disc spacer 26 by a known manner, e.g., vacuum evaporation, ion plating, or spattering. Note that, in the present embodiment, the electric conductive layer is formed on the whole surface of the hard disc spacer 26, but the electric conductive layer may be formed on at least the both side faces, which contact the hard discs 22, and a part of an inner circumferential face or a part of an outer circumferential face, which connects the both side faces as a connecting circuit.

(Fourth Embodiment)

Figure 8:
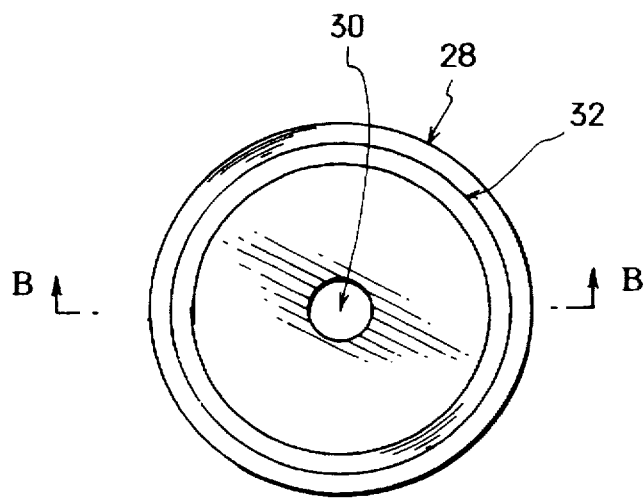
FIG. 8 is a plan view of a hard disc clamp shown in FIG. 1.
Figure 9:
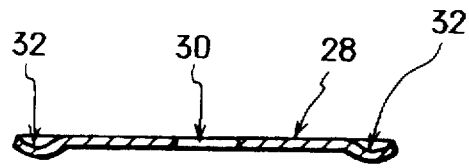
FIG. 9 is a sectional view taken along a line B—B in FIG. 7.

A Forth Embodiment will be explained with reference to FIGS. 8 and 9. A hard disc clamp 28 will be explained in the present embodiment.

The hard disc clamp 28 is made of the metal materials, e.g., stainless steel (SUS-430, etc.), aluminium, as well as the hard disc spacer 26 of the First Embodiment and the Second Embodiment. The hard disc clamp 28 is formed like a circular disc or a circular plate by press machining, etc. (see FIGS. 8 and 9). There is formed a through-hole 30 in the center of the hard disc clamp 28. Also, there is formed a circular groove 32 in an outer fringe section of the hard disc clamp 28.

In the case of manufacturing the hard disc clamp 28 too, the flash, which has been formed while the press machining step, in a surface of the starting piece of the hard disc clamp 28 is removed by the barrel polishing machine. And, to make the surface smooth and to correct size error, the starting piece of the hard disc clamp 28 is also finished by the lapping machine after the barrel polishing step.

After the lapping step, the finished starting piece of the hard disc clamp 28 is cleansed so as to remove the alien bodies, e.g., alumina particles, abraded powders, from the surface. Then the surface of the starting piece of the hard disc clamp 28 is coated with a coating layer 36. The coating layer 36 is made of a hard metal or a ceramic. The hard metal layer 36 is formed by a coating manner, e.g., hard chrome finishing, chrome finishing, nickel-plating, titanium coating; the ceramic layer 36 is formed by ceramic spraying.

As well as the hard disc spacers 26 of the First Embodiment and the Second Embodiment, the hard disc clamp 28 has the hard coating layer 36 on its surface. By forming the coating layer 36, the coating layer 36 covers over the alien bodies, which were stuck on the surface of the starting piece of the hard disc clamp 28 when the starting piece was machined or finished by machines, so that the alien bodies in the coating layer 36 cannot fall onto the hard discs 22, so that the trouble caused by the alien bodies can be effectively prevented. And, by forming the hard coating layer 36, hardness of the surface of the hard disc clamp 28 is greater, so the surfaces of the hard disc clamp 28 are not damaged even if the hard disc clamps 28 are mutually collided while manufacturing or conveying.

In the present invention, the hard coating layer or layers may be formed by an evaporation manner. And, the ceramic coating layer may be formed by spraying an electric conductive ceramic material.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A hard disc spacer through which a rotary shaft of a hard disc drive unit passes and which maintains a clearance between hard discs when the hard disc spacer is disposed between said hard discs, the hard disc spacer comprising:

a ring made of glass having an aperture for accepting said rotary shaft and having thickness for maintaining said clearance between said hard discs; and said ring having planar side surfaces with an electrically conducive layer disposed on each to conduct static electricity build-up from said hard discs to said rotary shaft.

2. A hard disc drive unit having hard discs and a rotary shaft and including said hard disc spacer of claim 1 disposed between said hard discs with said rotary shaft extending through said aperture.

3. The hard disc drive unit according to claim 2 wherein said ring and said hard discs have rates of thermal expansion that are substantially equal.

4. The hard disc spacer according to claim 1 wherein said ring has said planar side surfaces formed with a roughness of 0.15 s or greater.

5. The hard disc spacer according to claim 1 further comprising said ring having an inner circumferential surface with an electrically conductive layer disposed thereon to electrically connect said electrically conductive layers on said planar side surfaces to said rotary shaft.

6. The hard disc spacer according to claim 1 further comprising said having an electrically conductive layer on an outer circumferential surface of said ring to electrically connect said electrically conductive layers on said planar side surfaces.

7. The hard disc drive unit according to claim 1 wherein said electrically conductive layers are formed from at least one of aluminum, magnesium and copper.

8. A hard disc spacer through which a rotary shaft of a hard disc drive unit passes and which maintains a clearance between hard discs when the hard disc spacer is disposed between said hard discs, the hard disc spacer comprising:

a ring made of glass having an aperture for accepting said rotary shaft and having a thickness for maintaining said clearance between said hard discs;

said ring having planar side surfaces with an electrically conductive layer disposed on each; and said ring having an inner circumferential surface with an electrically conductive layer disposed thereon to electrically connect said electrically conductive layers on said planar side surfaces to said rotary shaft to conduct static electricity build-up from said hard discs to said rotary shaft.

9. The hard disc spacer according to claim 8 wherein said ring has said planar side surfaces formed with a roughness of 0.15 s or greater.

10. The hard disc spacer according to claim 8 further comprising said ring having an electrically conductive layer on an outer circumferential surface of said ring to electrically connect said electrically conductive layers on said planar side surfaces.

11. The hard disc drive unit according to claim 8 wherein said electrically conductive layers are formed from at least one of aluminum, magnesium and copper.

12. A hard disc spacer through which a rotary shaft of a hard disc drive unit passes and which maintains a clearance between hard discs when the hard disc spacer is disposed between said hard discs, the hard disc spacer comprising:

a ring made of glass having an aperture for accepting said rotary shaft and having a thickness for maintaining said clearance between said hard discs;

said ring having at least one planar side surface with an electrically conductive layer disposed thereon; and said ring having an inner circumferential surface with an electrically conductive layer disposed thereon to electrically connect said electrically conductive layer on said at least one planar side surfaces to said rotary shaft to conduct static electricity build-up from one of said hard discs in contact with said electrically conductive layer on said at least one planar side surfaces to said rotary shaft.

13. The hard disc spacer according to claim 12 wherein said ring has said planar side surfaces formed with a roughness of 0.15 s or greater.

14. The hard disc drive unit according to claim 12 wherein said electrically conductive layers are formed from at least one of aluminum magnesium and copper.

* * * * *